(12) United States Patent
Seigler et al.

(10) Patent No.: US 11,222,657 B1
(45) Date of Patent: Jan. 11, 2022

(54) HEAT-ASSISTED MAGNETIC RECORDING HEAD WITH A NEAR-FIELD TRANSDUCER EXTENDING BEYOND THE MEDIA-FACING SURFACE

(71) Applicant: Seagate Technology LLC, Fremont, CA (US)

(72) Inventors: Michael A. Seigler, Eden Prairie, MN (US); Peng Zhang, Bloomington, MN (US); David James Ellison, Minneapolis, MN (US); James D. Kiely, Edina, MN (US); Edwin F. Rejda, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/138,508

(22) Filed: Dec. 30, 2020

(51) Int. Cl.
| | |
|---|---|
| *G11B 11/105* | (2006.01) |
| *G11B 5/48* | (2006.01) |
| *G11B 5/60* | (2006.01) |
| *G11B 5/31* | (2006.01) |
| *G11B 5/41* | (2006.01) |
| *G11B 5/00* | (2006.01) |

(52) U.S. Cl.
CPC .......... *G11B 5/4866* (2013.01); *G11B 5/3169* (2013.01); *G11B 5/6029* (2013.01); *G11B 5/6076* (2013.01); *G11B 5/41* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,526,274 B2 | 9/2013 | Naniwairizo et al. | |
| 8,810,947 B1* | 8/2014 | Ren | G11B 5/314 360/59 |
| 8,837,071 B2 | 9/2014 | Declan et al. | |
| 8,902,720 B1* | 12/2014 | Schreck | G11B 5/314 369/13.33 |
| 8,958,271 B1 | 2/2015 | Chubing et al. | |
| 9,036,307 B1* | 5/2015 | Hoshiya | G11B 5/6088 360/313 |
| 9,123,370 B1* | 9/2015 | Ruan | G11B 5/607 |
| 10,163,456 B2* | 12/2018 | Chen | G11B 5/314 |
| 10,249,326 B1* | 4/2019 | Peng | G11B 13/08 |
| 10,319,400 B1* | 6/2019 | Wei | G11B 20/1816 |
| 10,770,098 B1* | 9/2020 | Peng | G11B 5/4866 |
| 2015/0262596 A1* | 9/2015 | Zuckerman | G11B 5/607 369/13.13 |
| 2016/0372140 A1* | 12/2016 | Bian | G11B 5/3163 |
| 2017/0047089 A1* | 2/2017 | Rajauria | G11B 5/6029 |

* cited by examiner

*Primary Examiner* — Tan X Dinh
(74) *Attorney, Agent, or Firm* — Mueting Raasch Group (57) ABSTRACT

A recording head has a waveguide that delivers optical energy from an energy source and a write pole extending to a media-facing surface of the recording head. The recording head also has a near-field transducer coupled to receive the optical energy from the waveguide and emit surface plasmons from the media-facing surface towards a recording medium while the write pole applies a magnetic field to the recording medium. The near-field transducer has an extended portion that, as-manufactured, protrudes beyond the media-facing surface by a first distance.

18 Claims, 11 Drawing Sheets

HEAT-ASSISTED MAGNETIC RECORDING HEAD WITH A NEAR-FIELD TRANSDUCER EXTENDING BEYOND THE MEDIA-FACING SURFACE

SUMMARY

The present disclosure is directed to a heat-assisted magnetic recording head with a near-field transducer extending beyond the media-facing surface. In one embodiment, a recording head includes a waveguide that delivers optical energy from an energy source and a write pole extending to a media-facing surface of the recording head. The recording head also has a near-field transducer coupled to receive the optical energy from the waveguide and emit surface plasmons from the media-facing surface towards a recording medium while the write pole applies a magnetic field to the recording medium. The near-field transducer has an extended portion that, as-manufactured, protrudes beyond the media-facing surface by a first distance.

In another embodiment, a method involves measuring a signal from a contact detection sensor that is at a media-facing surface of a recording head. The recording head has a near-field transducer that creates a hotspot on a recording medium while a magnetic field is applied to the hotspot. The near-field transducer has an extended portion that, as-manufactured, protrudes beyond the media-facing surface by a first distance. Based on a transition in the signal, the method involves determining contact between the recording head the recording medium. Based on the determination of the contact, the method involves applying a control signal to a clearance actuator of the recording head. The control signal causes the media-facing surface to maintain a first head-to-media spacing from the recording medium, the control signal causing the extended portion of the near-field transducer to maintain a second head-to-media spacing from the recording medium that is less than the first head-to-media spacing.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and excites the near-field transducer.

In some embodiments, an NFT includes an enlarged part which receives light energy from the waveguide and funnels this energy, which is in the form of surface plasmon polaritons (SPP), to an elongated part (e.g., a peg) that extends from the enlarged part towards the recording medium. The peg directs the SPP to the recording medium, which creates a hotspot that facilitates writing via the magnetic field.

In existing HAMR heads, the elongated part of the NFT terminates at the media-facing surface of the head, also referred to herein as the air-bearing surface (ABS). The ABS may be covered by a protective coating such as diamond-like carbon (DLC). The DLC protects various components (e.g., a write pole) from corrosion, burnish, and other effects that may result from exposure to the drive atmosphere and from contact with the disk surface.

In embodiments described below, an NFT of a HAMR head is manufactured to have an elongated part that extends from the ABS towards the recording medium. The material in an area surrounding the elongated part may also extend out from the ABS, forming a pedestal structure. While extending parts of the NFT beyond the ABS may seem counterintuitive, it has been found that having part of the NFT nearly in contact or in contact with the recording medium can improve performance of the HAMR head, such as reduction in required laser current ($I_{eff}$), reduction in track width that can increase areal density capacity (ADC). The fly height and clearance actuator settings of the HAMR head may be adjusted to account for some portions of the read/write transducer that may contact the recording medium before other parts of the ABS.

Figure 1:
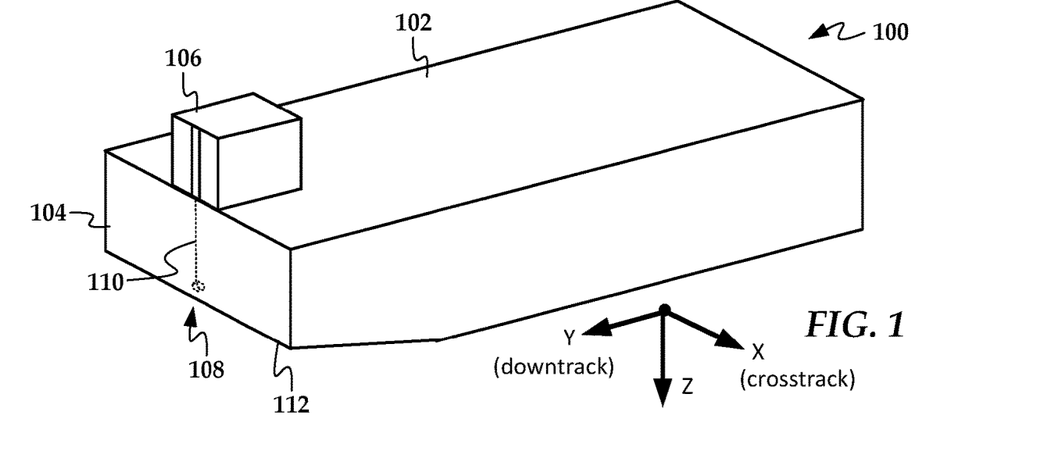
FIG. 1 is a perspective view of a slider assembly according to an example embodiment.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

Figure 2:
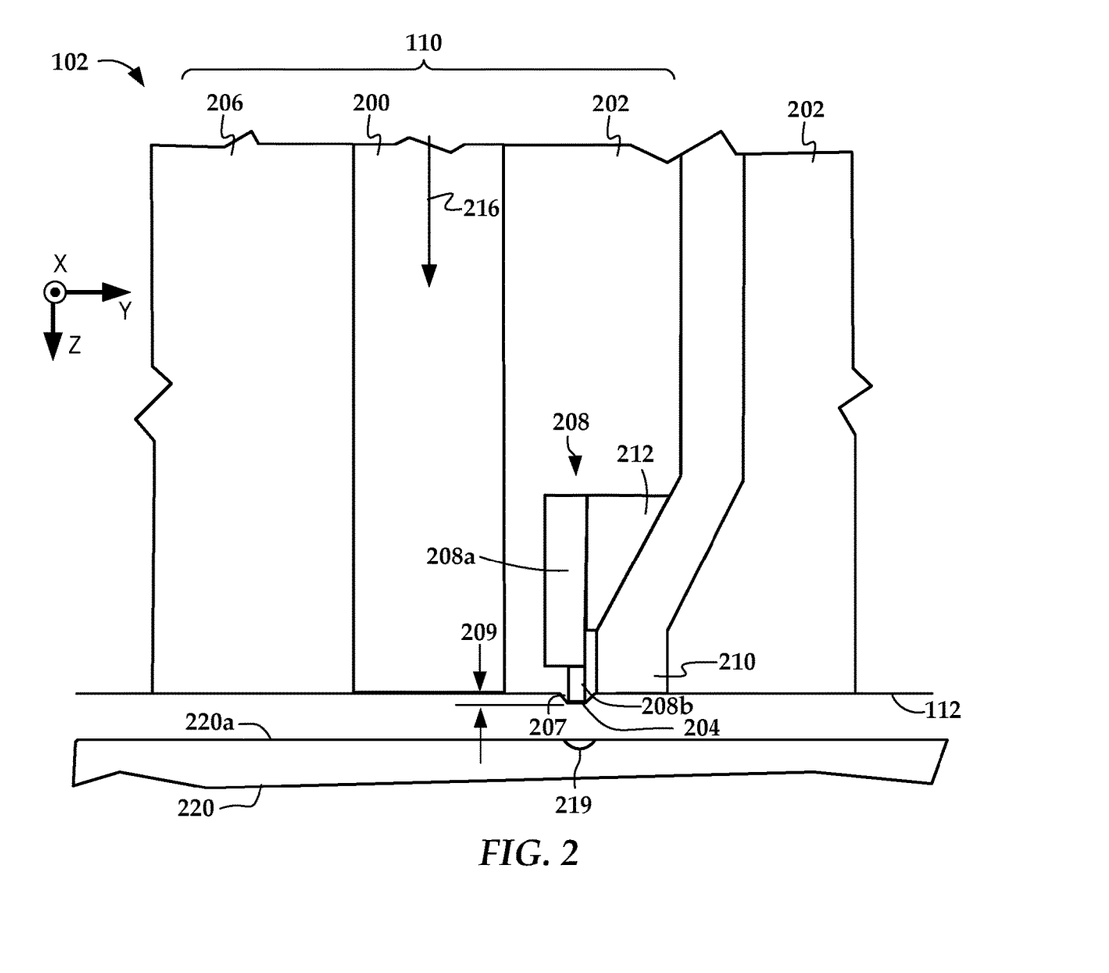
FIGS. 2 and 3 are cross-sectional views of a slider along a down-track plane according to according to an example embodiment.

In FIG. 2, a cross-sectional view shows details of a slider body 102 according to an example embodiment. The waveguide 110 includes a core 200, top cladding layer 202 and bottom cladding 206. Other cladding layers not shown in this figure may be used with this waveguide 110, such as middle and side cladding. The core 200 delivers light to an NFT 208 that is located at the media-facing surface 112. A write pole 210 (also referred to herein as a "magnetic pole") is located near the NFT 208. A heat sink 212 may be used to thermally couple the NFT 208 to the write pole 210.

A magnetic coil (not shown) induces a magnetic field through the write pole 210 in response to an applied current. During recording, the waveguide 110 delivers light 216 from a light source to the NFT 208. The NFT 208 directs surface plasmons out of the media-facing surface 112 to form a hotspot 219 within a recording layer of a moving recording medium 220. The write pole 210 sets a magnetic orientation in the hotspot 219, thereby writing data to the recording medium 220.

In this configuration, the NFT 208 includes an enlarged part 208a and an elongated part 208b extending from the enlarged part 208a towards and normal to the media-facing surface 112. The enlarged part 208a may be configured, for example, as a circular disk and the elongated part 208b may be configured, for example, as a peg having a rectangular or triangular shape as seen normal to the media-facing surface 112. The NFT 208 may be made from a combination of optically efficient materials such as Au or Ag, and mechanically robust materials such as Rh or Ir.

For example, the enlarged part 208a may be made of Au. An Au disk/plate can maximize coupling light between the waveguide 110 and the enlarged part 208a, and is large enough and recessed enough from the media-facing surface 112 such that there is a reduced chance for degradation (e.g., voiding, deformation) that may occur for smaller Au features that are closer to the media-facing surface 112.

The elongated part 208b may be made from a mechanically robust material that is less susceptible to deformation, voiding, etc., that can occur with Au and similar soft metals. Such mechanically robust materials may also be resistant to oxidation and other types of corrosion. While robust materials such as Rh and Ir may be less optically efficient than Au, their mechanical durability generally outweighs losses in coupling efficiency. The NFT 208 may include additional structures shown here that are formed of the different types of materials. For example, the enlarged part 208a may be formed of multiple layers of an optically efficient metal and a mechanically robust metal, or the elongated part 208b may have an expanded region where it is embedded within the enlarged part 208a.

As indicated by dimension 209, the elongated part 208b extends beyond the media-facing surface 112. This dimension 209 is as-manufactured, meaning that it is formed via a manufacturing process such as photolithography and layer deposition. This is in contrast to situations where a HAMR read/write head experiences local protrusion at or near the NFT due to local heating and thermal expansion. In those cases, when he head is at a uniform temperature (e.g., ambient temperature, with no local heating applied near the NFT), the NFT will not extend beyond the media-facing surface. In contrast, the illustrated NFT elongated part 208b will extend beyond the media-facing surface 112 when the slider body 102 is at a uniform temperature. The portion of the NFT elongated part 208b that extends beyond the media-facing surface 112 may be referred to herein as a pedestal 204.

As shown in this example, regions 207 surrounding the elongated part 208b may also be manufactured to extend beyond the media-facing surface 112. This surrounding material 207 may be considered as part of the pedestal 204. The pedestal 204 allows the NFT 208 to be placed closer to the media surface 220a than other components such as the tip of the write pole 210.

Figure 3:
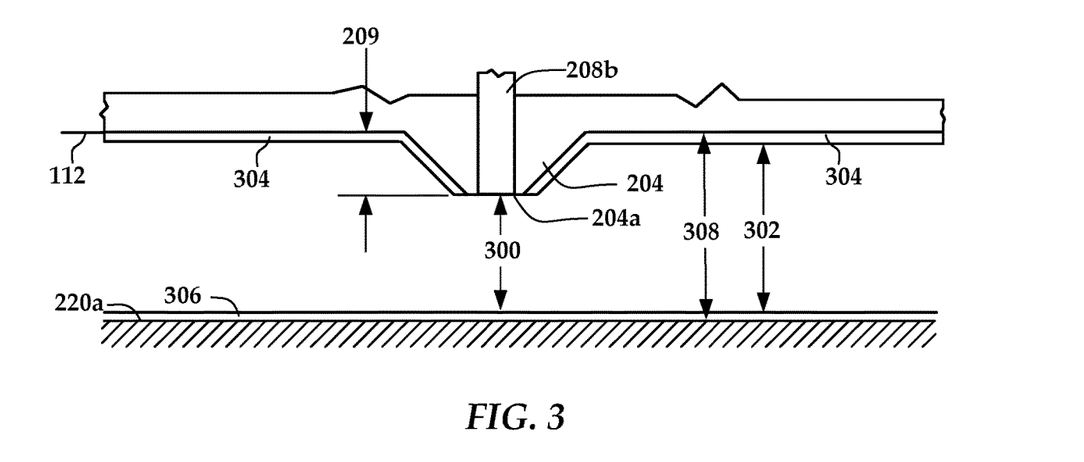

In FIG. 3, a diagram shows additional details of the pedestal 204 of FIG. 2. The media-facing surface 112 is offset from the moving media surface 220a by a head-to-media separation (HMS) 302. Unless stated otherwise, the term HMS in this disclosure is intended to describe a minimum clearance between a feature of the head and the media, which may be different at different regions of the head at a given passive fly height, e.g., distances 300 and 302 shown in FIG. 3. The passive fly height is an average fixed clearance between the media-facing surface and the media induced by air-bearing features of the head. The passive fly height does not include clearance changes caused by fixed or adjustable regions that protrude from (or are recessed from) a plane of the media-facing surface. The HMS 302 is maintained by a combination of a passive fly height and a clearance actuator (not shown), e.g., a heater. The fly height is maintained by a thin layer of gas (e.g., air, helium) between air bearing features of the head's media-facing surface 112 and the media surface 220a. The HMS 302 is a measure of the local separation between the read/write transducers and the media surface 220a, which can be adjusted dynamically by regulating an amount of current applied to the clearance actuator. There may be multiple clearance actuators, e.g., used to separately control HMS of the read transducer(s) and HMS of the write transducer(s).

As seen in FIG. 3, an HMS 300 of the pedestal 204, which includes the elongated part 208b of the NFT 208, is less than the local HMS 302, e.g., the average HMS of writer components such as write pole, return pole, shields, etc. Both HMS 300, 302 may be affected similarly by a write transducer clearance actuator such that both HMS 300, 302 are reduced or increased similarly by the clearance actuator. In some embodiments, the clearance control system may work on setting the writer HMS 302, with the understanding that the HMS 300 of the pedestal 204 may be less than the HMS 302. In some embodiments, the HMS 300 may be at or close to zero, such that the pedestal 204 comes into occasional or continuous contact with the media surface 220a, even though the rest of the media-facing surface 112 has no contact or minimal contact.

In FIG. 3, an overcoat 304 is shown covering the media-facing surface 112. The overcoat 304 may be made from an impact-resistant and corrosion resistant material such as DLC. The overcoat 304 is shown conformably covering at least part of the pedestal 204. The overcoat 304 may fully cover the pedestal 204 as manufactured, and after some time in operation, the overcoat 304 may be burnished from the tip 204a of the pedestal due to contact with the media surface 220a.

Another overcoat 306 is shown in FIG. 3, this one covering the recording media surface 220a. The media overcoat 306 may be formed of a carbon material similar to the head overcoat 304. Note that for purposes of this discussion, the HMS 302 is shown being measured from the top of the media overcoat 306 to the bottom of the head overcoat 304. For other purposes, a distance 308 between a component at the media-facing surface 112 of the head and the magnetic media material at surface 220a may be described as the HMS. For example, the HMS-dependent performance of the write pole would be determined based on the HMS 308 and not HMS 302, as this is the distance that is spanned by the magnetic field emitted by the write pole.

Figure 4:
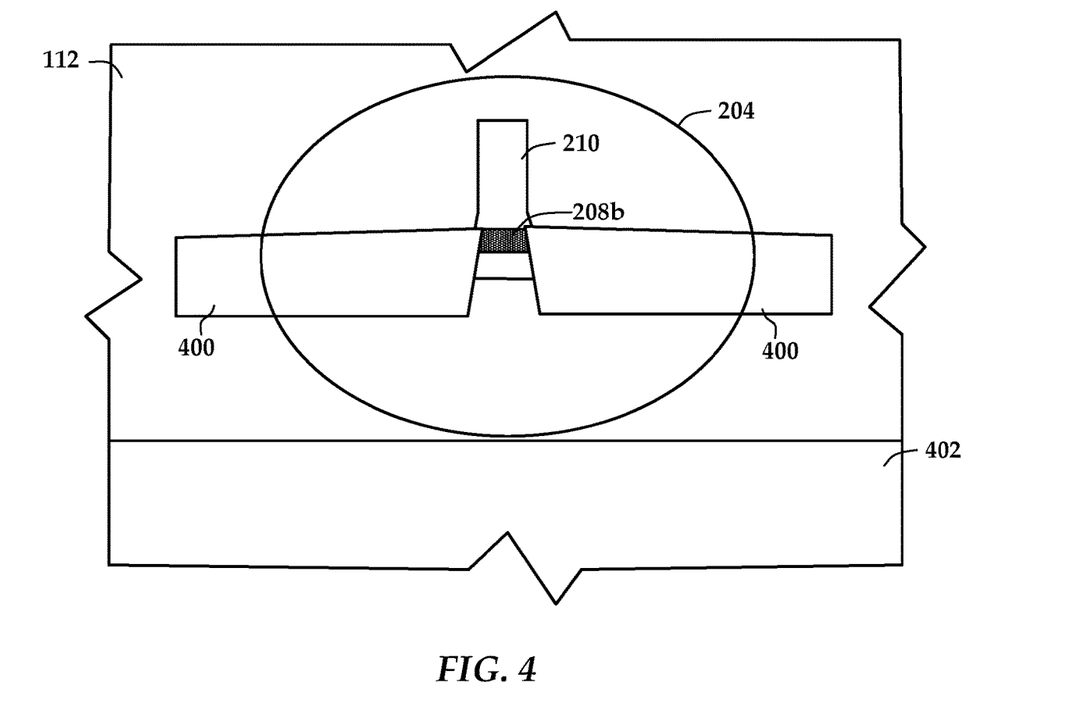
FIGS. 4 and 5 are media-facing surface views of a head according to an example embodiment.

In FIG. 4, the pedestal 204 is seen in a plan view looking at the media-facing surface 112. The outline of the pedestal 204 appears as an oval in this view, however may have any shape. Generally, the pedestal may be formed so that it does not extend to the write pole 210, but may affect other components near the elongated part 208b of the NFT 208, such as side shields 400, write pole 210, and waveguide core 402. The write pole 210 is made of an iron alloy, which could corrode if exposed to the drive's atmosphere, so the pedestal 204 may have a size and shape that prevents burnishing near the write pole 210 or other structures made of material that might corrode. Generally, the current process capability can for a pedestal 204 as small as 1-2 µm in the downtrack direction and can be positioned on the media-facing surface 112 to within 1-2 µm.

Figure 5:
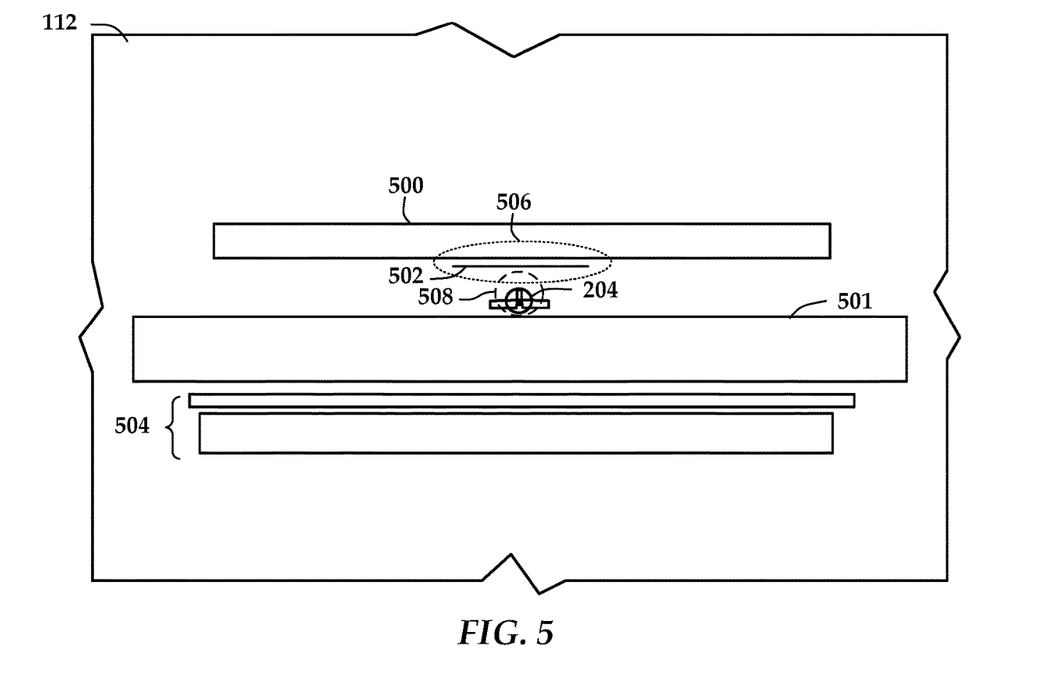

In FIG. 5, a plan view at a larger scale than FIG. 4 shows additional components surrounding the pedestal 204, including return poles 500 and 501, contact sensor 502, and read transducer 504 (e.g., magnetoresistive stack). The contact sensor 502 may be a temperature sensor, sometimes referred to as a dual-ended, temperature coefficient of resistance (DETCR) sensor. The contact sensor 502 is sensitive to sudden temperature changes that occur when the head approaches and contacts the media surface. The signal of the contact sensor 502 is used by the clearance control system to adjust and control the HMS near the writer and reader.

The highlighted region 504 in FIG. 5 generally indicates a region that contacts the media during contact detect. In one embodiment, the pedestal 204 is sized and located to be outside this region 504 (e.g., >0.5 um separation from the sensor 502), therefore allowing the existing contact algorithms to maintain the HMS for the regions of the media-facing surface 112 except for the pedestal 204. The estimated HMS using these algorithms can also be used to estimate the clearance between the tip of the pedestal 204 and the media surface. For example, if the HMS is estimated to be 6 nm and the pedestal 204 extends 4 nm from the media-facing surface 112, then the pedestal 204 will be about 2 nm from the media surface.

In other embodiments, the contact sensor 502 and pedestal 204 can be located close enough to each other that the contact sensor 502 detects contact between the pedestal 204 and the recording medium before the rest of the media-facing surface 112 contacts. This is indicated by circle 508 in FIG. 5, which is an alternate extent of the pedestal 204. The contact detect algorithms can be adapted to account for this configuration as well. Using the example above, where the desired HMS for the head is 6 nm and the pedestal extends 4 nm, the contact detection controller cause the clearance actuator to back off 2 nm from the operating point where contact is detected.

While FIG. 5 shows pedestal dimensions 204, 508 that are roughly equal in downtrack and crosstrack directions, these dimensions may be significantly different from each other. For example, if the pedestal dimensions affect the contact detect and clearance setting (e.g., if pedestal is too close to DETCR clearance detector) then this may prescribe tight control of the downtrack dimension of the pedestal, however significant variation in the crosstrack direction may be acceptable. If the pedestal dimension is such that clearance modulation can be affected (e.g., pedestal area hitting disc is too large) then both downtrack and cross-track dimensions may be more tightly controlled. In one embodiment, the downtrack dimension of the pedestal may be around 2 µm or less, whereas the crosstrack dimension may be much larger, e.g., two times larger. For a smaller downtrack dimension, e.g., 1 µm or less, an even larger aspect ratio may be possible, e.g., three or more times larger in the crosstrack direction.

In FIGS. 6-9, graphs illustrate how pedestal height can affect performance of a HAMR recording head according to example embodiments. In these graphs, the HAMR head is modeled as having an HMS 302 (see FIG. 3) away from the pedestal of around 6.5 nm, with the x-axes of the graphs (pHMS) corresponding to the clearance 300 shown in FIG. 3. The dashed lines indicate a baseline performance value with pedestal dimension 209 equal to zero, which corresponds to no pedestal being used.

Figure 6:
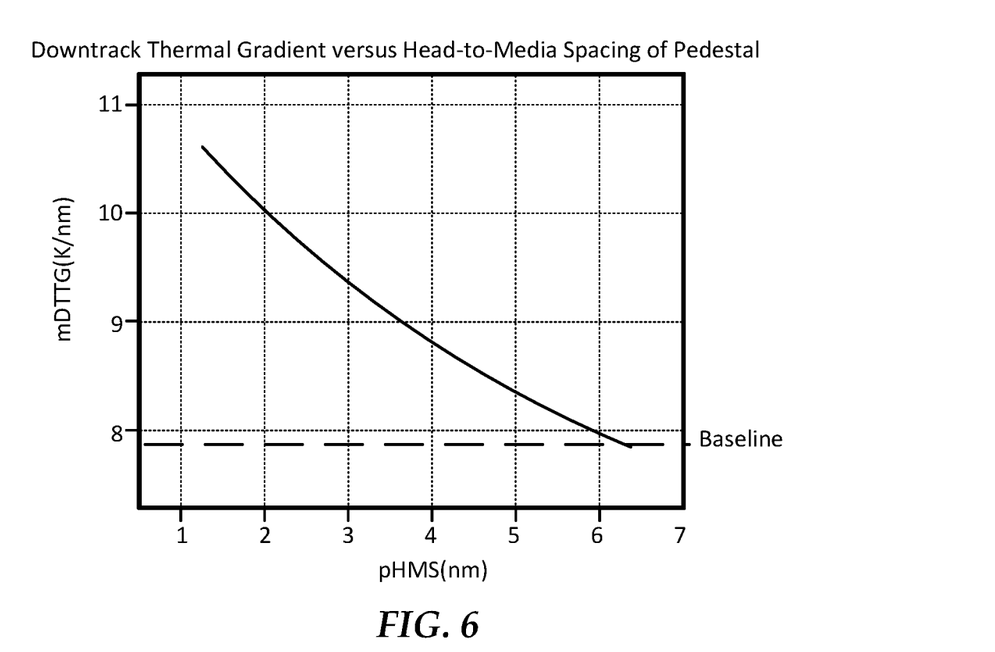
FIGS. 6, 7, 8, and 9 are graphs of simulation results that demonstrate performance improvements for a near-field transducer pedestal according to example embodiments.
Figure 7:
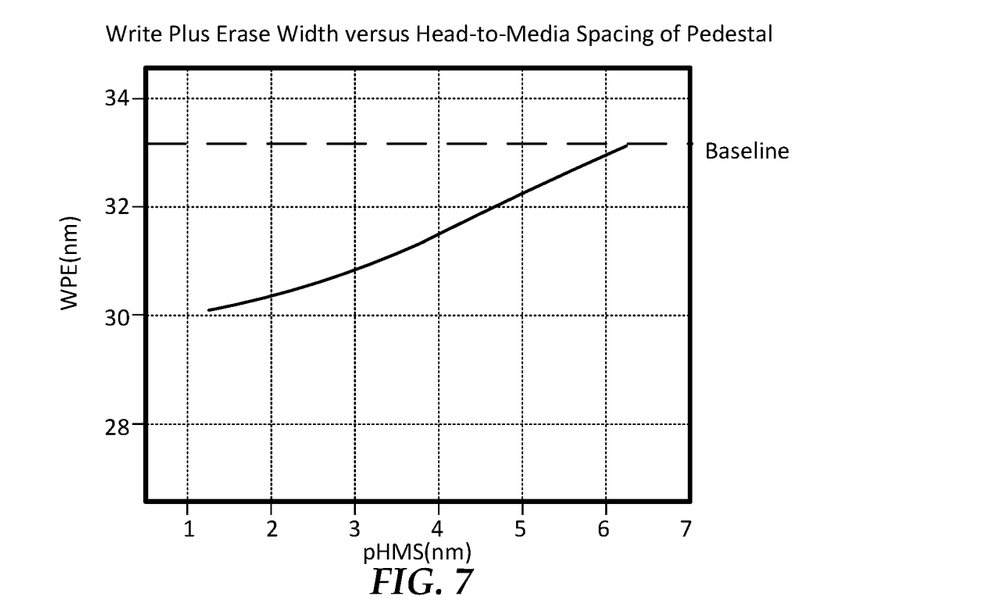
Figure 8:
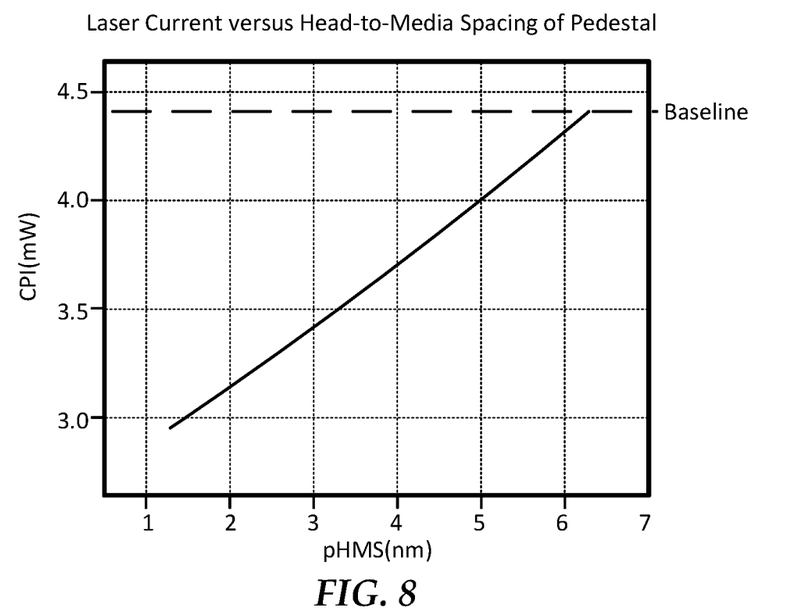
Figure 9:
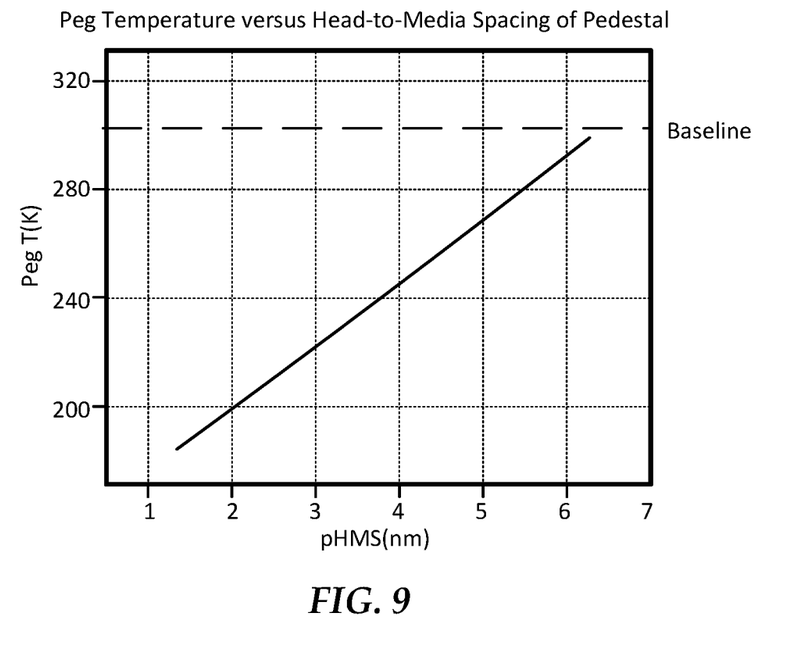

As shown in FIG. 6, the thermal gradient increases with decreasing pHMS, and this can increase the linear bit density that can be written to the tracks. As shown in FIG. 7, the write-plus-erase width decreases with decreasing pHMS, and this can increase the track density that can be written to the disk. The results in FIGS. 6 and 7 indicate an increase in ADC in response to a decrease in pHMS. As shown in FIGS. 8 and 9, both laser current and peg temperature decrease with decreasing pHMS. These latter figures indicate an extension of the life of the HAMR head in response to a decrease in pHMS.

In order to validate these simulations, a set of prototype HAMR heads were fabricated with three pedestal heights of 2, 4, and 6 nm. The trends in performance of these heads generally matched those shown in the simulations, with the following seen for the 6 nm pedestal heads: 3.2% ADC gain, 1.6K/nm downtrack thermal gradient (DTTG) gain, 1.5K/nm crosstrack thermal gradient (CTTG) gain, 2.5 mA decrease in laser current (Ieff). No bit error rate (BER) degradation was detected in the heads or media. Note that the prototype heads used in this testing had an Rh peg.

In reference again to FIG. 3, assuming the pedestal dimension 209 is large enough (e.g., >1 nm), the passive fly height can be increased by a similar height. For example, if an existing NFT design without a pedestal is known to work with a passive fly height of X, and the design is changed to include a pedestal dimension 209 of Y, the passive fly height with the pedestal may be set in a range from X to X+Y, assuming other components such as the write pole and return poles can operate effectively at the higher clearance, which can help lower reader temperature for better reliability and reduce the variance of the passive fly height. Note that in this scenario, if X=Y, then the pedestal would be in contact with the media at the lower end of this range.

Figure 10A:
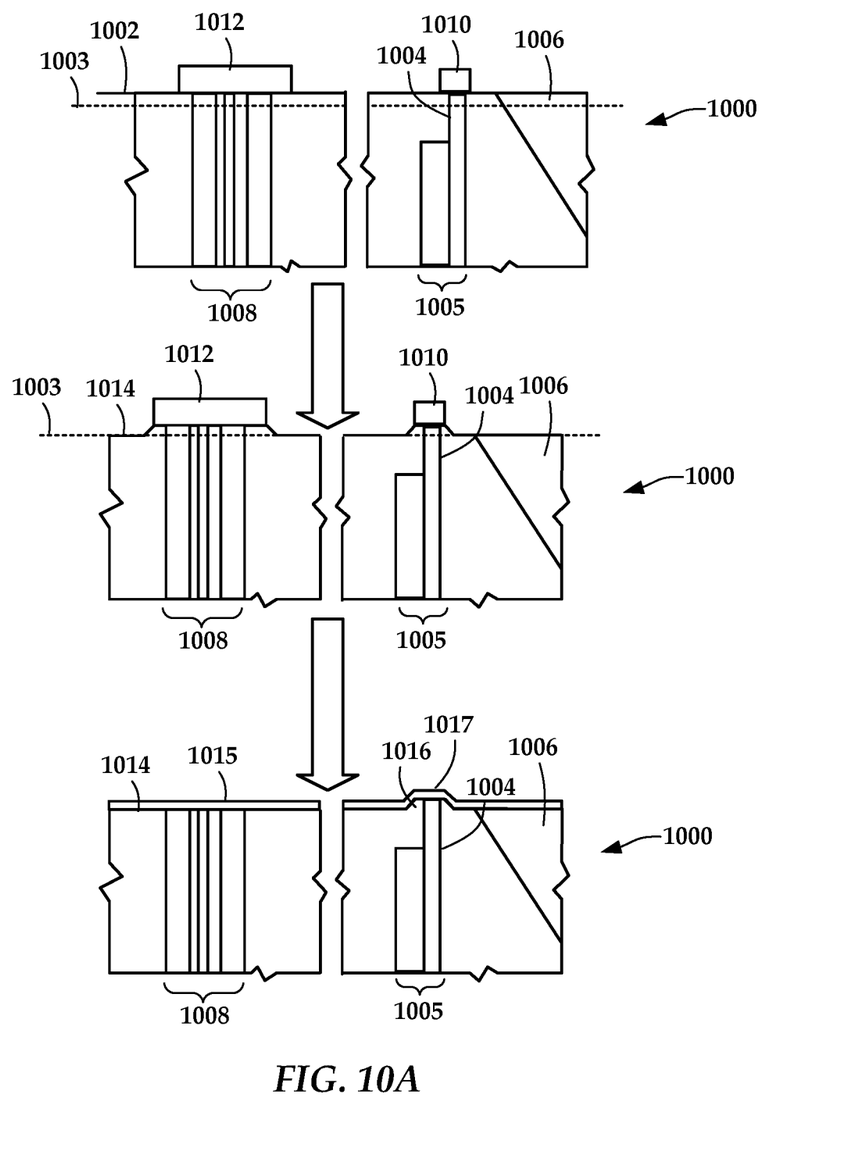
FIGS. 10A and 10B are process diagrams of slider manufacture according to example embodiments.

In FIG. 10A, a process diagram shows pedestal formation on a HAMR slider 1000 according to an example embodiment. The recording head 1000 is shown after completing a lapping operation. Generally, sliders are formed on a wafer using layer deposition and photolithography processes, and the wafer separated into slider structures, e.g., bars of sliders. A mechanical lapping process removes materials from the media-facing side of the slider 1000, resulting in lapped surface 1002 that exposes some components of the slider 1000, such as an extended part 1004 of an NFT 1005, write pole 1006, and read transducer 1008.

In this example, the lapping has stopped at surface 1002, which is short of the final dimension, represented by dashed line 1003. As seen in the top of FIG. 10A, the NFT extended part 1004 is covered by a feature 1010, which may be a resist or hardmask that is shaped through photolithography. A second feature 1012 is also shown protecting the read transducer 1008.

As seen in the middle of FIG. 10A, an operation has etched the media-facing surface 1014 to the final dimension 1003, except for the areas covered by features 1010, 1012. At the bottom of FIG. 10, the resist/hardmask has been removed, and the read transducer 1008 brought to final dimension, e.g., through a mechanical process. The overcoat 1015 is then deposited over the surface 1014. The resulting pedestal 1016 is shown with the overcoat 1015 covering end 1017. The material at the end 1017 may later be removed (burnished) during operation of the drive through contact with the disk, or may be removed during another manufacturing operations.

Figure 10B:
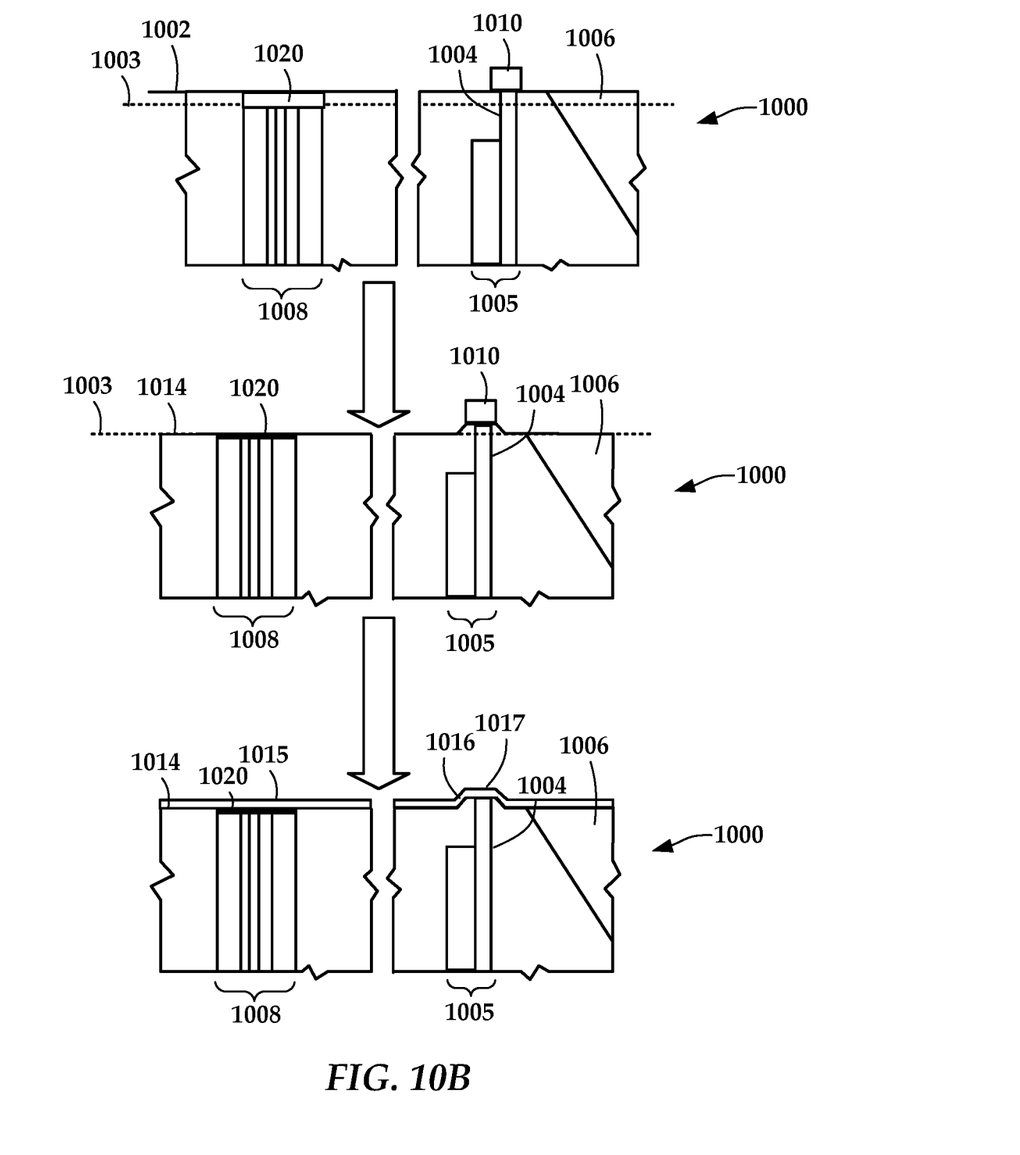

In FIG. 10B, a process diagram shows pedestal formation on a HAMR slider 1000 according to another example embodiment. The recording head 1000 is shown after completing a lapping operation. Generally, sliders are formed on a wafer using layer deposition and photolithography processes, and the wafer separated into slider structures, e.g., bars of sliders. A mechanical lapping process removes materials from the media-facing side of the slider 1000, resulting in lapped surface 1002 that may expose some components of the slider 1000, such as an extended part 1004 of an NFT 1005, write pole 1006, and read transducer 1008.

In this example, the lapping has stopped at surface 1002, which is short of the final dimension, represented by dashed line 1003. As seen in the top of FIG. 10B, the NFT extended part 1004 is covered by a feature 1010, which may be a resist or hardmask that is shaped through photolithography. A second feature 1020 is also shown that was previously formed to protect the read transducer 1008. The lapping operation exposes one face of this second feature.

As seen in the middle of FIG. 10B, an operation has etched the media-facing surface 1014 to the final dimension 1003, except for the areas covered by feature 1010. At the bottom of FIG. 10, the resist/hardmask has been removed. In this example, a small amount of the second feature 1020 remains over the read transducer 1008, resulting in a small recession from the media-facing surface 1014. The overcoat 1015 is then deposited over the surface 1014. The resulting pedestal 1016 is shown with the overcoat 1015 covering end 1017. The material at the end 1017 may later be removed (burnished) during operation of the drive through contact with the disk, or may be removed during another manufacturing operations.

Other variations of the processes shown above may be possible. In one embodiment, the process may further involve lifting off part of the overcoat 1015, so it doesn't cover the pedestal 1016, or other parts of the slider surface 1014. In such a case, a different overcoat may be deposited over the pedestal 1016, read transducer 1008, and/or recessed write pole 1006. In other embodiments, instead of etching the media-facing surface to form the pedestal, the pedestal and part of the NFT can be deposited on the completed head. In such a case a cap or extension of the NFT can be added to the existing peg/elongated part, and may be made of the same or different materials than the peg/elongated part.

Figure 11A:
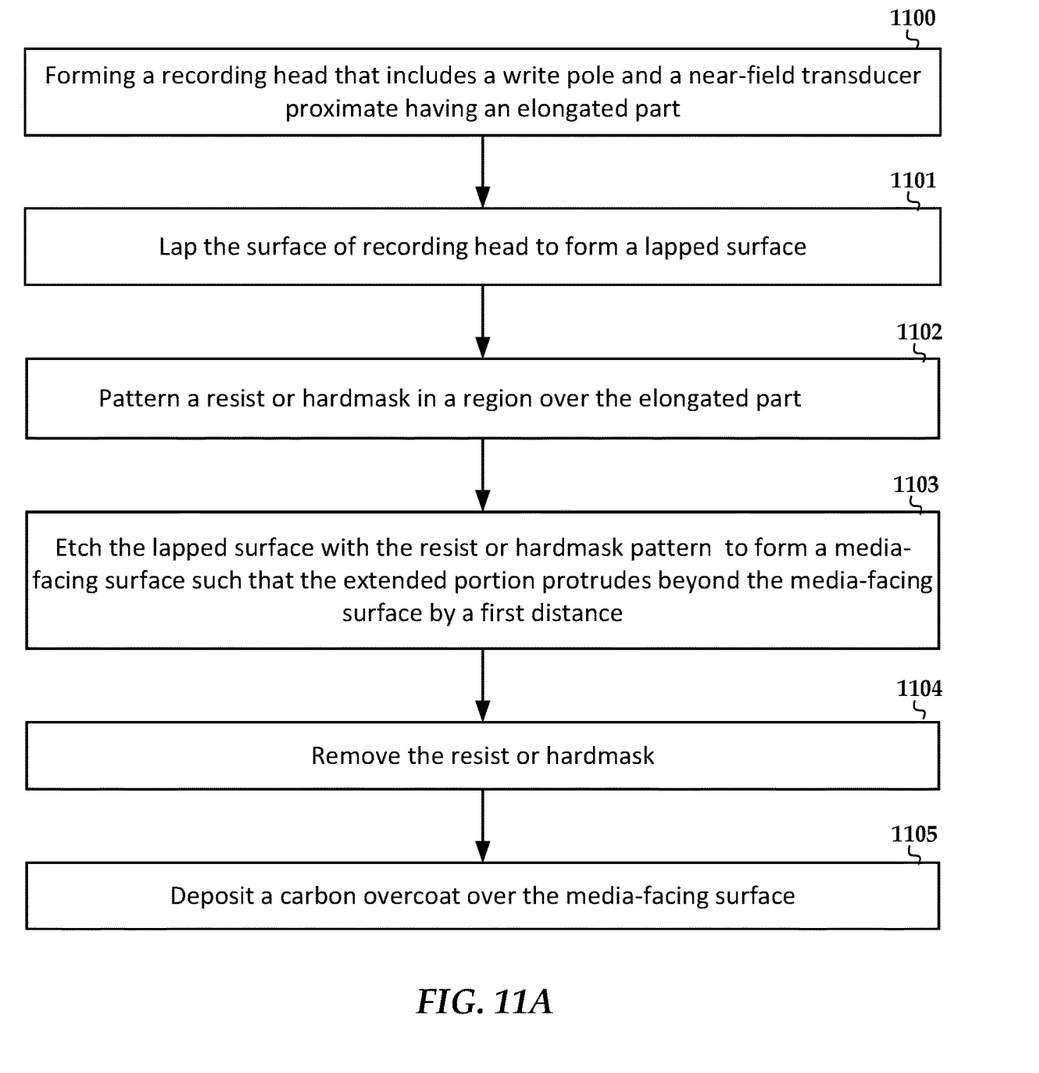
FIGS. 11A, 11B, and 12 are flowcharts of methods according to an example embodiment.

In FIG. 11A, a flowchart shows a method of manufacturing a HAMR head according to an example embodiment. The method involves forming 1100 a HAMR recording head that has a waveguide, a write pole, and a near-field transducer proximate the write pole. The near-field transducer has an elongated part operable to direct plasmons to a recording medium. The surface of recording head is lapped 1101 to form a lapped surface. A resist or hardmask is patterned 1102 in a region over the elongated part. The lapped surface with the resist or hardmask pattern is etched 1103 to form a media-facing surface. The location of the resist or hardmask is such that the extended portion protrudes beyond the media-facing surface by a first distance after the etch. The resist or hardmask is removed 1104 and a carbon overcoat is deposited 1105 over the media-facing surface.

Figure 11B:
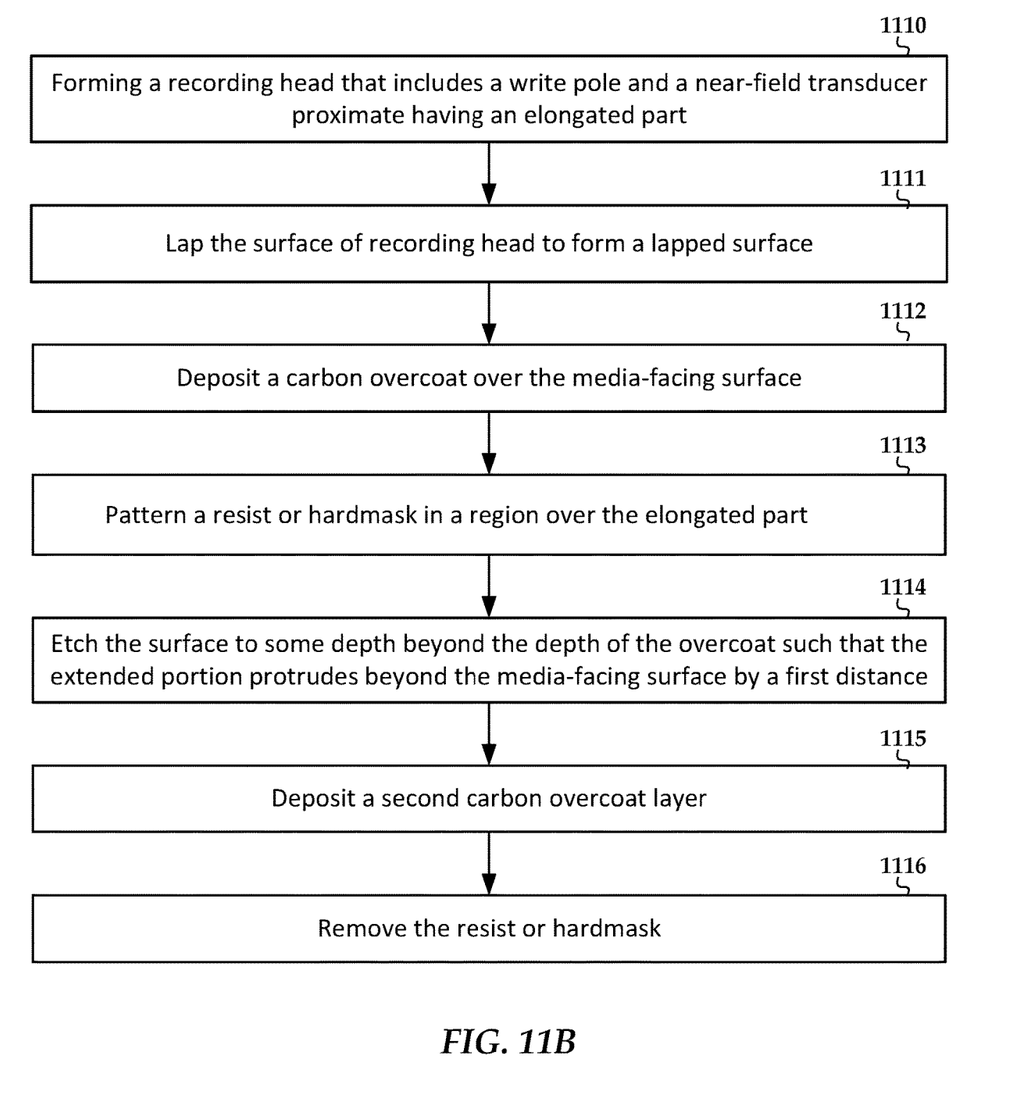

In FIG. 11B, a flowchart shows a method of manufacturing a HAMR head according to another example embodiment. The method involves forming 1100 a HAMR recording head that has a waveguide, a write pole, and a near-field transducer proximate the write pole. The near-field transducer has an elongated part operable to direct plasmons to a recording medium. The surface of recording head is lapped 1101 to form a lapped surface. Then a carbon overcoat is deposited 1112, and a resist or hardmask is patterned 1113 in a region that encompasses the elongated part. The surface is etched 1114 to some depth beyond the depth of the overcoat such that the extended portion protrudes beyond the media-facing surface by a first distance after the etch. A second overcoat layer is applied 1115 over the resist or hardmask and the region that encompasses the extended portion. The resist or hardmask is then removed 1116 to leave one layer of overcoat everywhere.

A HAMR head implementing the extended NFT part/pedestal as described herein may take the height of the pedestal into account when performing active clearance control. As noted in the description of FIG. 5, a contact sensor can be located relative to the pedestal such that wherein the contact detection sensor detects contact between the pedestal and a recording medium. In other embodiments, the pedestal is separated from the contact detection sensor such that the contact detection sensor detects contact between the recording medium and a region of the media-facing surface located away from the pedestal. In the latter case, it may be assumed that when contact is not detected on the region of the media-facing surface, there still may be contact between the pedestal and the media-facing surface.

Figure 12:
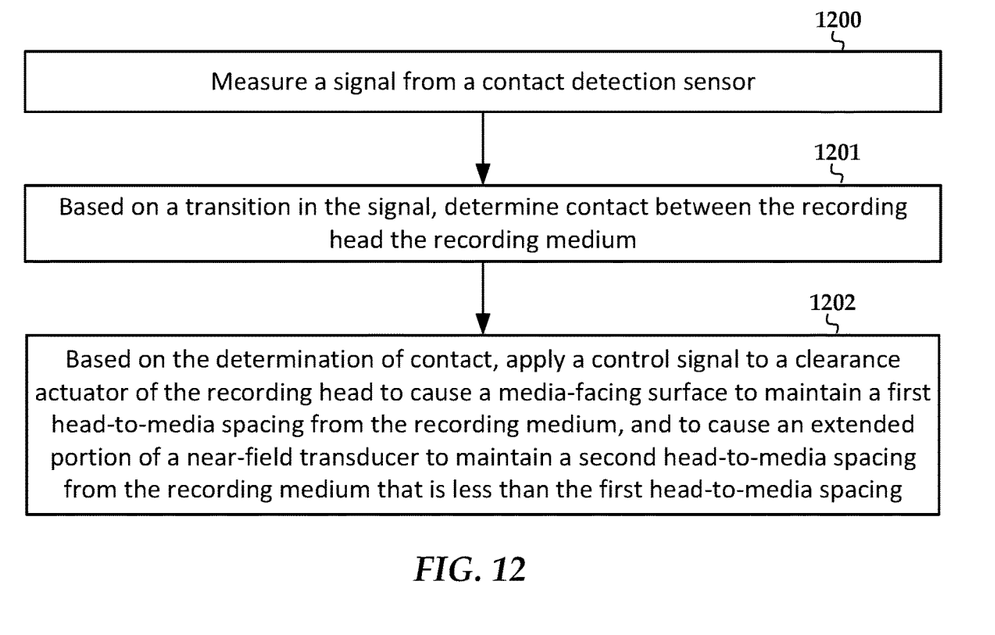

In FIG. 12, a flowchart illustrates a method of use of a HAMR drive according to an example embodiment. The method involves measuring 1200 a signal from a contact detection sensor that is at a media-facing surface of a recording head. The recording head has a near-field transducer that creates a hotspot on a recoding medium while a magnetic field is applied to the hotspot. The near-field transducer has an extended portion that, as-manufactured, protrudes beyond the media-facing surface by a first distance. Based on a transition in the signal, contact is determined 1201 between the recording head the recording medium.

Based on the determination of the contact, a control signal is applied 1202 to a clearance actuator of the recording head. The control signal causes the media-facing surface to maintain a first head-to-media spacing from the recording medium. The control signal also causes the extended portion of the near-field transducer to maintain a second head-to-media spacing from the recording medium that is less than the first head-to-media spacing.

In one embodiment, the contact determined 1201 is between the recording head and a region of the media-facing surface located away from the extended portion of the near-field transducer. In such a case, a response of the control signal applied at 1202 is based on maintaining the first clearance. In another embodiment, the contact is between the recording head and the extended portion of the near-field transducer (also referred to as the pedestal). In such a case, a response of the control signal applied at 1202 response of the control signal is based on maintaining the second clearance.

Figure 13:
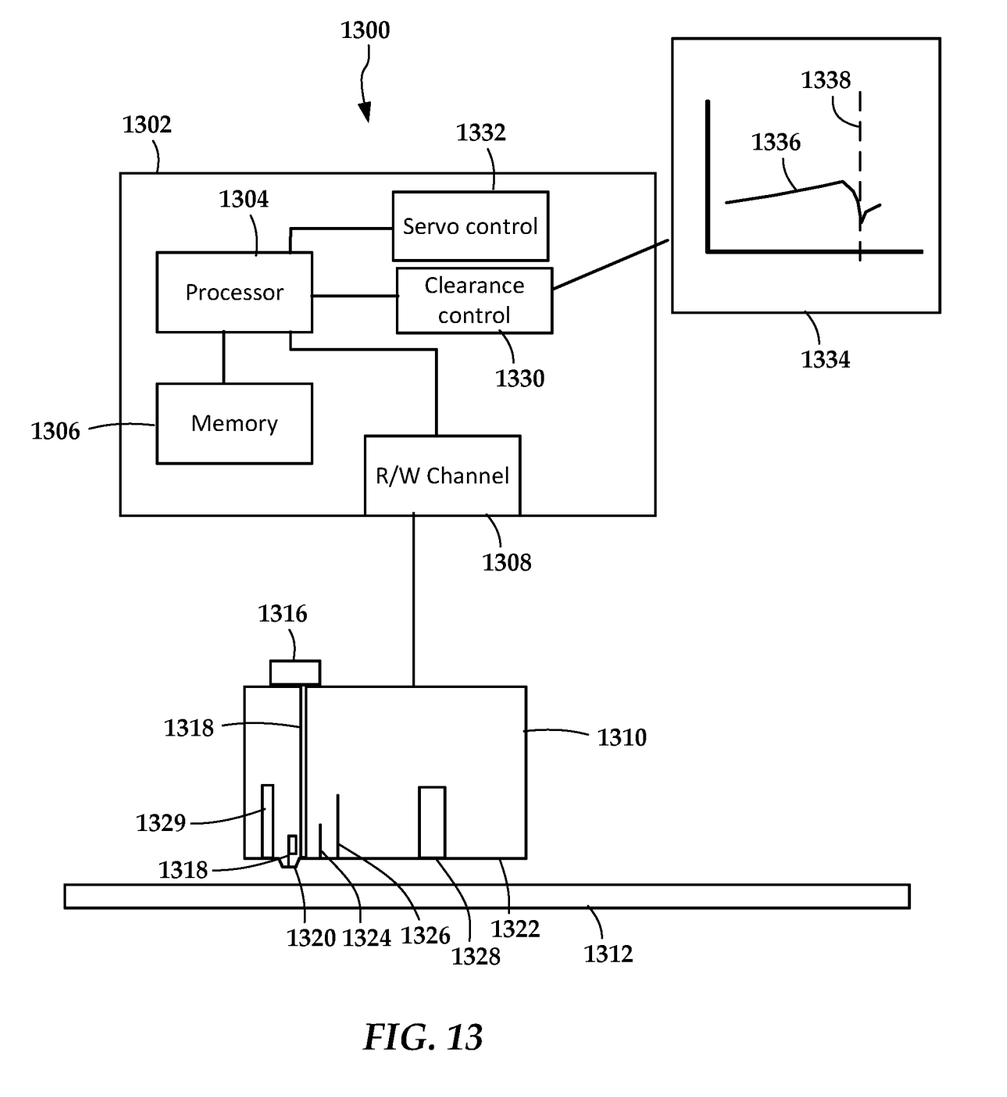
FIG. 13 is a block diagram of a disk drive apparatus according to an example embodiment.

In FIG. 13, a block diagram illustrates components of a HAMR drive 1300 according to an example embodiment. The drive 1300 includes circuitry 1302 that may include a system on a chip (SoC), power supply, host interface circuitry, etc. The circuitry 1302 may include one or more processors 1304 coupled to memory 1306. The memory 1306 may include volatile and non-volatile memory, and is used to at least store and execute firmware of the drive 1300.

A read/write channel 1308 is used to communicate with one or more heads 1310 that read from and write to a magnetic disk 1312.

The head 1310 includes a laser 1314 (or other energy source), a waveguide 1316 (or other energy delivery path) and an NFT 1318. Part of the NFT 1318 extends beyond a media-facing surface 1322 of the head to form a pedestal 1320. A contact detection sensor 1324 is located at the media-facing surface 1322, and sends a signal 1336 via the channel 1308 back to a clearance control module 1330. As indicated by block 1334, the signal 1336 may be a time varying signal that measures temperature at the media-facing surface 1332. Typically, the temperature rises as the head 1310 approaches the surface of the disk 1312, with a sharp transition when contact is made. This transition, indicated by line 1338, is due to heat transfer from the head 1310 to the disk 1312 during the contact.

The clearance control module 1330 uses the signal 1336 to send a control signal to a clearance actuator 1326 located near the media-facing surface 1322. This actuator 1326 may include a heater that causes local deformation of the media-facing surface 1332 due to thermal expansion of the head material. More than one contact detection sensor 1324 may be used as well as more than one clearance actuator 1326. For example, different head-to-media spacings may be maintained for a read transducer 1328 during reading and a write transducer (which includes NFT 1318 and write pole 1329) during writing. Different heaters and/or contact detection sensors may be used in the different modes.

Note that the due to the extension of the pedestal 1320, it may be subject to additional wear due to more frequent contact with the disk than what is seen by the other regions of the media-facing surface 1322. This can be mitigated by performing a 'dummy' write operation at a high clearance (e.g., a clearance high enough that no data is written) and/or at a region of the disk 1312 where no important data is stored. This writing with subsequent idling of the write transducer has been found to build up a layer of oxide (e.g., $SiO_2$) at the write transducer. Generally, a servo control subsystem 1332 schedules operations of the heads, include times when the write transducer of the heads will be idled, e.g., when heads are parked or otherwise minimally powered, during long reads, etc. Thus, if the system determines that the writer will be idled, the head could perform the dummy writing for a sufficient period of time (e.g., 1-2 seconds) to put a build-up of $SiO_2$ on the heads thereby protecting the pedestal 1320 against corrosion. The dummy write could be performed use any signal, e.g., a 2T tone, random data, etc.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A recording head, comprising:
   a waveguide that delivers optical energy from an energy source;
   a write pole extending to a media-facing surface of the recording head; and
   a near-field transducer coupled to receive the optical energy from the waveguide and emit surface plasmons from the media-facing surface towards a recording medium while the write pole applies a magnetic field to the recording medium, the near-field transducer comprising a plasmon resonating part that, as-manufactured, protrudes beyond the media-facing surface by a first distance.

2. The recording head of claim 1, wherein the plasmon resonating part of the near-field transducer comprises Ir or Rh.

3. The recording head of claim 1, wherein a region of material surrounding the plasmon resonating part of the near-field transducer extends from the media-facing surface by the first distance to form a pedestal.

4. The recording head of claim 3, wherein the pedestal does not exceed 2 μm in size in a downtrack direction.

5. The recording head of claim 4, wherein the pedestal does not exceed 1 μm in size in a downtrack direction.

6. The recording head of claim 3, further comprising a contact detection sensor that is located downtrack from the pedestal, wherein the pedestal is separated from the contact detection sensor by at least 0.5 μm.

7. The recording head of claim 1, wherein the first distance is between 2 and 6 nm.

8. The recording head of claim 1, further comprising a carbon overcoat over the media-facing surface, the carbon overcoat covering at least part of the plasmon resonating part that protrudes beyond the media-facing surface.

9. The recording head of claim 1, further comprising a contact detection sensor at the media-facing surface, wherein the extended portion of the near-field transducer is separated from the contact detection such that the contact detection sensor detects contact between the plasmon resonating part and a recording medium.

10. The recording head of claim 1, further comprising a contact detection sensor at the media-facing surface, wherein the extended portion of the near-field transducer is separated from the contact detection sensor such that the contact detection sensor detects contact between a recording medium and a region of the media-facing surface located away from the plasmon resonating part.

11. A method, comprising:
   measuring a signal from a contact detection sensor that is at a media-facing surface of a recording head, the recording head comprising a near-field transducer that creates a hotspot on a recording medium while a magnetic field is applied to the hotspot, the near-field transducer comprising an extended portion that, as-manufactured, protrudes beyond the media-facing surface by a first distance;

based on a transition in the signal, determining contact between the recording head the recording medium; and based on the determination of the contact, applying a control signal to a clearance actuator of the recording head, the control signal causing the media-facing surface to maintain a first head-to-media spacing from the recording medium, the control signal causing the extended portion of the near-field transducer to maintain a second head-to-media spacing from the recording medium that is less than the first head-to-media spacing.

12. The method of claim 11, wherein the contact is between the recording head and a region of the media-facing surface located away from the extended portion of the near-field transducer, and wherein a response of the control signal is based on maintaining the first head-to-media spacing.

13. The method of claim 11, wherein the contact is between the recording head and the extended portion of the near-field transducer, and wherein a response of the control signal is based on maintaining the second head-to-media spacing.

14. The method of claim 11, further comprising, determining that the near-field transducer will be idled, and in response thereto, performing a dummy write to coat the extended portion with an oxide to reduce corrosion.

15. The method of claim 14, wherein the dummy write is performed at a head-to-media separation that is high enough to prevent data from being written to the recording medium.

16. The method of claim 14, wherein the dummy write is performed at a part the recording medium where no important data is stored.

17. The recording head of claim 1, wherein the surface plasmon resonating part comprises a peg extending from an enlarged part of the near-field transducer.

18. The recording head of claim 17, wherein the enlarged part comprises an Au disc.

* * * * *